(No Model.)
R. L. EWING.
VEHICLE WHEEL.
No. 425,095. Patented Apr. 8, 1890.
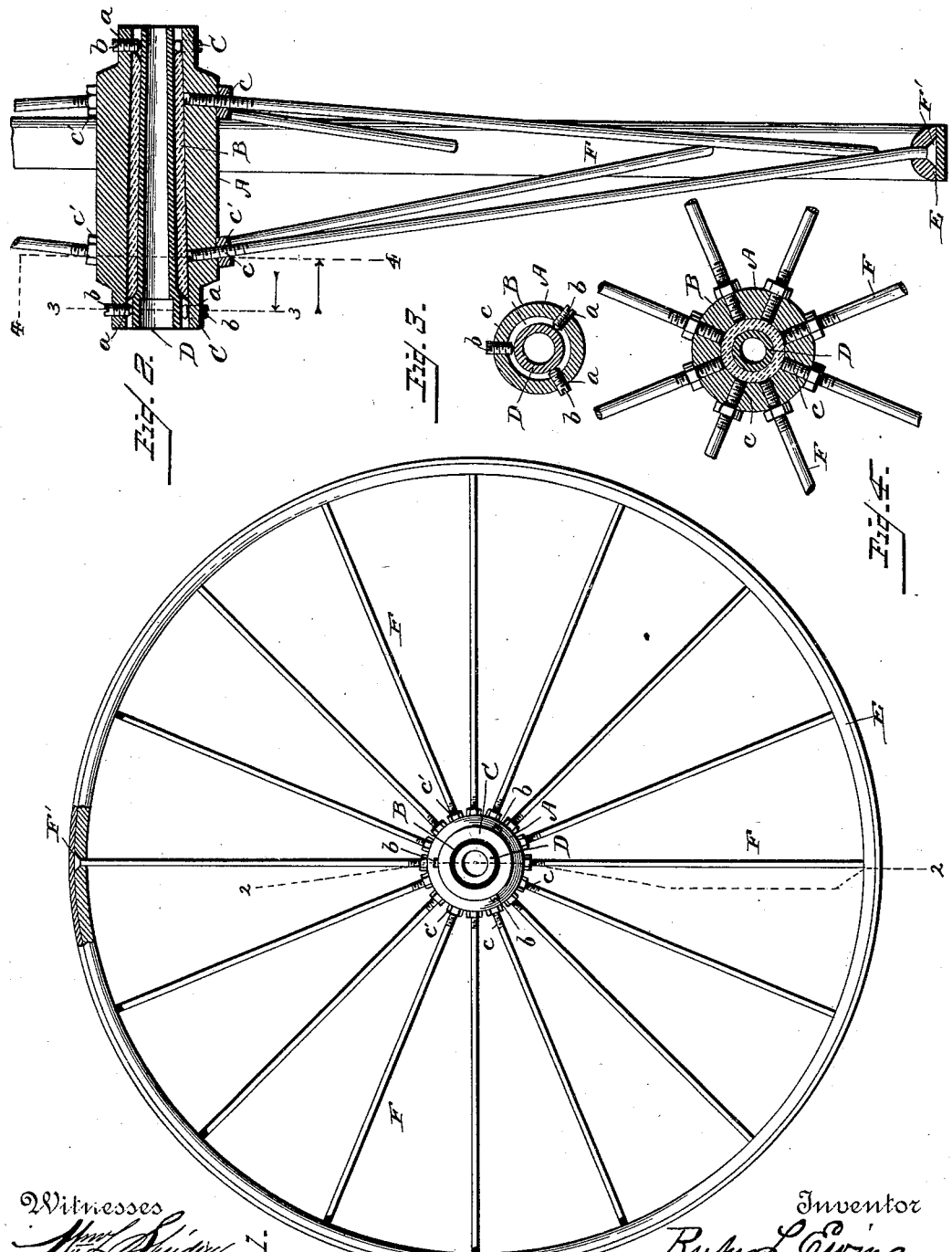
Witnesses  
Inventor  
Rufus L. Ewing  
By his Attorney  
Franklin H. Hough

UNITED STATES PATENT OFFICE.

RUFUS LINCOLN EWING, OF McCLEARY, PENNSYLVANIA.

VEHICLE-WHEEL.

SPECIFICATION forming part of Letters Patent No. 425,095, dated April 8, 1890.

Application filed January 31, 1890. Serial No. 338,708. (No model.)

*To all whom it may concern:*

Be it known that I, RUFUS LINCOLN EWING, a citizen of the United States, residing at McCleary, in the county of Beaver and State of Pennsylvania, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in vehicle-wheels, and it has more especial reference to that class of wheels in which a cast-iron hub is used in connection with metallic spokes and rim.

The invention has for its object to generally improve upon the construction of this class of wheels; and to this end it consists, first, in providing a cast-iron hub adapted to receive and have secured therein any of the various sizes or forms of boxes that are used upon vehicle-axles, thus rendering the hub serviceable for use upon any vehicle, either light or heavy.

The invention further consists in the construction and manner of attaching the metallic spokes of the wheel, whereby the spokes may be readily placed in position, and whereby they may be adjusted, when desired, in order to retain the perfect form of the wheel at all times, and at the same time retain the tire securely in position upon the rim of the wheel without the necessity of resetting the tire or of resorting to the common expedient of cutting the rim of the wheel.

To these ends and to such others as the invention may pertain, the same consists in the peculiar construction and in the novel combination, arrangement, and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, like letters of reference indicating like parts throughout the several views, and in which drawings—

Figure 1 is a side elevation of a vehicle-wheel constructed in accordance with my invention. Fig. 2 is a section on the line 2 2, on an enlarged scale. Fig. 3 is a section upon the line 3 3. Fig. 4 is a section on line 4 4, Fig. 2.

Reference now being had to the details of the drawings by letter, A represents the hub of the wheel, which is cast in a single piece and is provided with a central opening B of greater diameter than the diameters of any of the boxes that are commonly employed in connection with vehicle-wheels. The hub is provided at each of its ends with extensions C C, preferably of less diameter than the body of the hub, said extensions C being provided with a series of screw-threaded openings $a$ for the reception of set-screws $b$, for a purpose which will presently appear. The journal-box D is inserted with the hub, and is held in position by the set-screws $b$, and after the box has been properly adjusted and secured in its adjusted position by the set-screws the space intervening between the box and hub is filled with either Babbitt metal, lead, or other suitable packing.

The metallic rim E of the wheel is provided at proper intervals with holes for the reception of the spokes, the entrances to the holes upon the outer face of the rim being enlarged, so as to permit the heads of the spokes to be countersunk below the face of the rim, as will presently appear.

The spokes F are rods of metal screw-threaded at their inner ends, as shown at $c$, to adapt them to be inserted within screw-threaded openings in the hub. The ends of the spokes adjacent to the rim are provided with enlarged portions F′, which, when the spokes are in place, bear against the inner face of the rim. The extreme end of the spoke above the enlargement F′ is passed through the hole in the rim and is headed within the enlarged outer end of the hole, so as to retain the spoke in place and at the same time admit of its being freely rotated. The screw-threaded portions $c$ of the spokes are provided with binding-nuts $c'$.

From the foregoing description it will be readily seen that the spokes may be readily either lengthened or shortened, as desired, by simply loosening the binding-nuts $c'$ and then turning the spokes, so as to vary the distance that they are inserted within the hub, and after they have been properly adjusted they are secured in their adjusted positions by simply tightening the nuts. In this manner, whenever the tire may be found to be loose or the wheel out of circle, it may be quickly and readily adjusted.

Having thus described my invention, what I claim to be new, and desire to secure by Letters Patent, is—

The herein-described metallic wheel for vehicles, the same comprising, in combination, a hub cast in a single piece, a box within the hub of less diameter than the diameter of the opening in the hub, and secured therein by set-screws, as described, with the space intervening between the box and hub filled with suitable packing material, the spokes having their outer ends countersunk in the rim and provided with enlarged portions, as described, and their inner ends screw-threaded and inserted within screw-threaded openings in the hub, and the binding-nuts upon the spokes adjacent to the hub, substantially as shown and described, and for the purpose specified.

In testimony whereof I affix my signature in presence of two witnesses.

RUFUS LINCOLN EWING.

Witnesses:
   D. P. SHAFFER,
   DAVID EWING.